Feb. 24, 1953   E. P. DRAKE ET AL   2,629,550
CALCULATING MACHINE
Filed June 12, 1950   10 Sheets-Sheet 1

INVENTORS
EDWARD P. DRAKE
RICHARD S. MARK
BY
Fred N. Schwend
ATTORNEY

INVENTORS
EDWARD P. DRAKE
RICHARD S. MARK

Feb. 24, 1953  E. P. DRAKE ET AL  2,629,550
CALCULATING MACHINE

Filed June 12, 1950  10 Sheets-Sheet 4

INVENTORS
EDWARD P. DRAKE
RICHARD S. MARK
BY
ATTORNEY

INVENTORS
EDWARD P. DRAKE
RICHARD S. MARK
BY
ATTORNEY

Feb. 24, 1953  E. P. DRAKE ET AL  2,629,550
CALCULATING MACHINE

Filed June 12, 1950  10 Sheets—Sheet 8

INVENTORS
EDWARD P. DRAKE
RICHARD S. MARK
BY
Fred N. Schwend
ATTORNEY

Feb. 24, 1953     E. P. DRAKE ET AL     2,629,550
CALCULATING MACHINE
Filed June 12, 1950     10 Sheets—Sheet 9
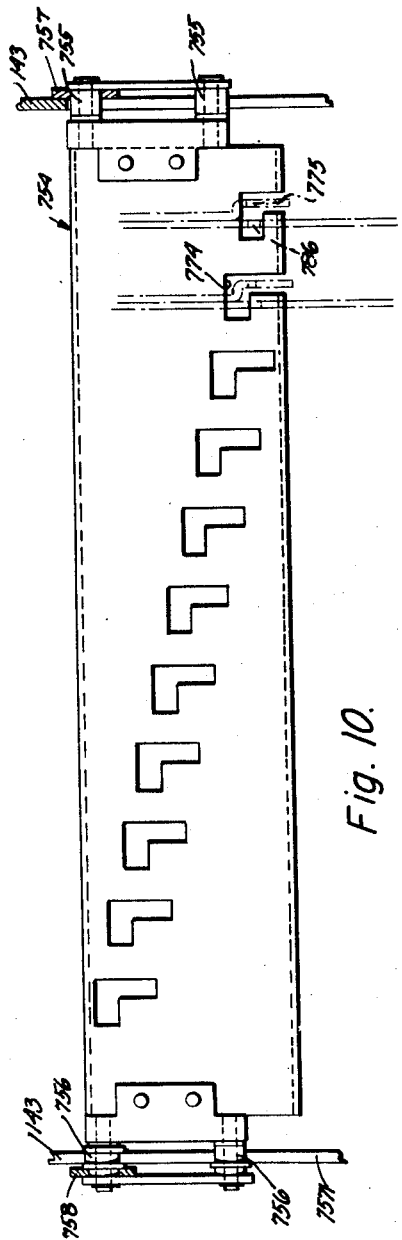
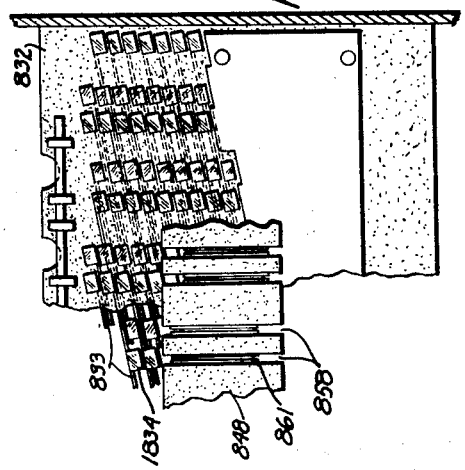
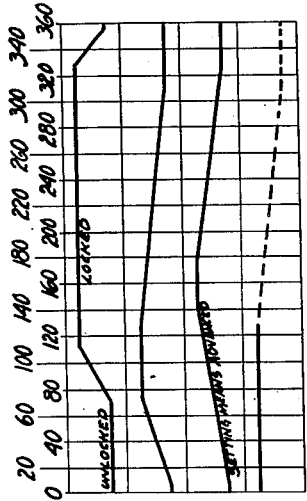
INVENTORS
EDWARD P. DRAKE
RICHARD S. MARK
ATTORNEY

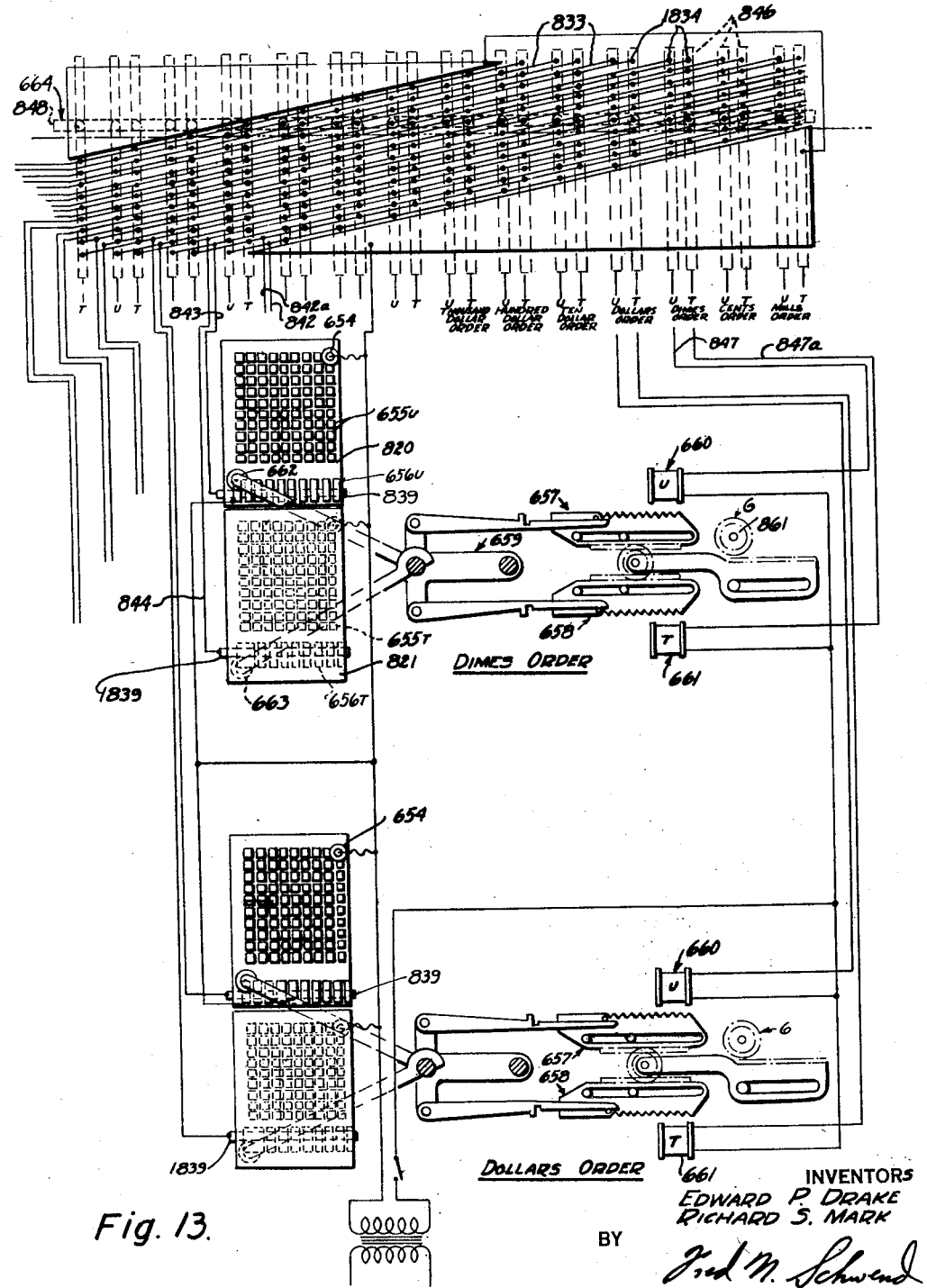

Patented Feb. 24, 1953

2,629,550

UNITED STATES PATENT OFFICE 2,629,550

CALCULATING MACHINE

Edward P. Drake, Glendale, and Richard S. Mark, Arcadia, Calif., assignors to Clary Multiplier Corporation, San Gabriel, Calif., a corporation of California Application June 12, 1950, Serial No. 167,612

11 Claims. (Cl. 235—61)

This invention relates to timing mechanism and has particular reference to mechanism for alternately controlling the functioning of two or more independently operable mechanisms.

The invention is an improvement over mechanism previously developed for a similar purpose and disclosed in the copending application of R. E. Boyden et al., Serial No. 710,880, filed November 19, 1946, and since matured into Patent No. 2,515,692, issued on July 18, 1950.

In the foregoing machine, a multiplier factor denomination selecting device is provided for multiplication purposes in order to sequentially cause control elements arranged in successively higher denominational orders of the machine, and representing the different denominationally arranged digits of a multiplier factor, to become effective to control multiplication whereby, in effect, to control multiplication by digits of successively higher order denominations of a multiplier factor, one digit at a time. At the same time, a denomination distributing device is provided to enter the various sub-products of multiplication, which are obtained by multiplying the multiplicand by the different digits in the multiplier, into successively higher denominational orders in an accumulator so as to properly accumulate the total product. Thus, the denomination selecting device and the denomination distributing device are successively advanced through various corresponding increments of travel. Where zeros occur in the multiplier factor, the two devices skip through the corresponding increments.

The movement of the denomination selecting device and the denomination distributing device must be so timed that both devices locate in corresponding control positions for the proper selection of a multiplier digit and the proper distribution of the sub-products in the product accumulator. However, in order to save time, the machine is so arranged that the denomination selecting device will operate in advance of the denomination distributing device to select a new denomination or digit of the multiplier while the denomination distributing device is in a position controlling entry of the sub-product of a current multiplication in accordance with a previously selected multiplier digit, into a selected group of denominations of the accumulator. After completion of the current multiplication, the denomination distributing device will advance to a position corresponding to the position of the denomination selecting device which is already set in its new selecting position.

In the foregoing machine, control mechanism is provided as disclosed in said Boyden et al. patent which allows the denomination selecting device to be spring advanced one increment, or several increments, if one or more zeros are present in the multiplier factor. Thereafter, the denominations distributing device is allowed to likewise be spring advanced to a new corresponding position and to be arrested in such position by the already set denomination selecting device. Although the aforementioned mechanism is generally satisfactory it involves a spring action which snaps both the denomination selecting device and the denomination distributing device forward to their new positions at an uncontrolled rate of speed and if both devices were to skip through several increments, due to the presence of a number of successive zeros in the multiplier factor, they would obtain considerable momentum and would result in a violent jarring action and possible rebound from their arrested positions.

Accordingly, the principal object of the present invention is to overcome the above-noted defects.

Another object is to sequentially move two elements to corresponding positions.

Another object is to sequentially move such elements to corresponding positions at controlled rates of speed.

The manner in which the above and other objects of the invention are accomplished will be readily understood on reference to the following specification and read in conjunction with the accompanying drawing wherein:

Figs. 1 and 2 jointly illustrate a longitudinal section view of a calculating machine embodying the present invention.

Fig. 10 is a front view of the multiplier digit selection control plate.

Fig. 11 is a front view, partly broken away, of the denomination shifting device.

Fig. 12 is a timing chart of the machine.

Fig. 13 is a diagram showing the relationship between the circuits and the mechanisms of the multiplying instrumentalities.

Figure 1:
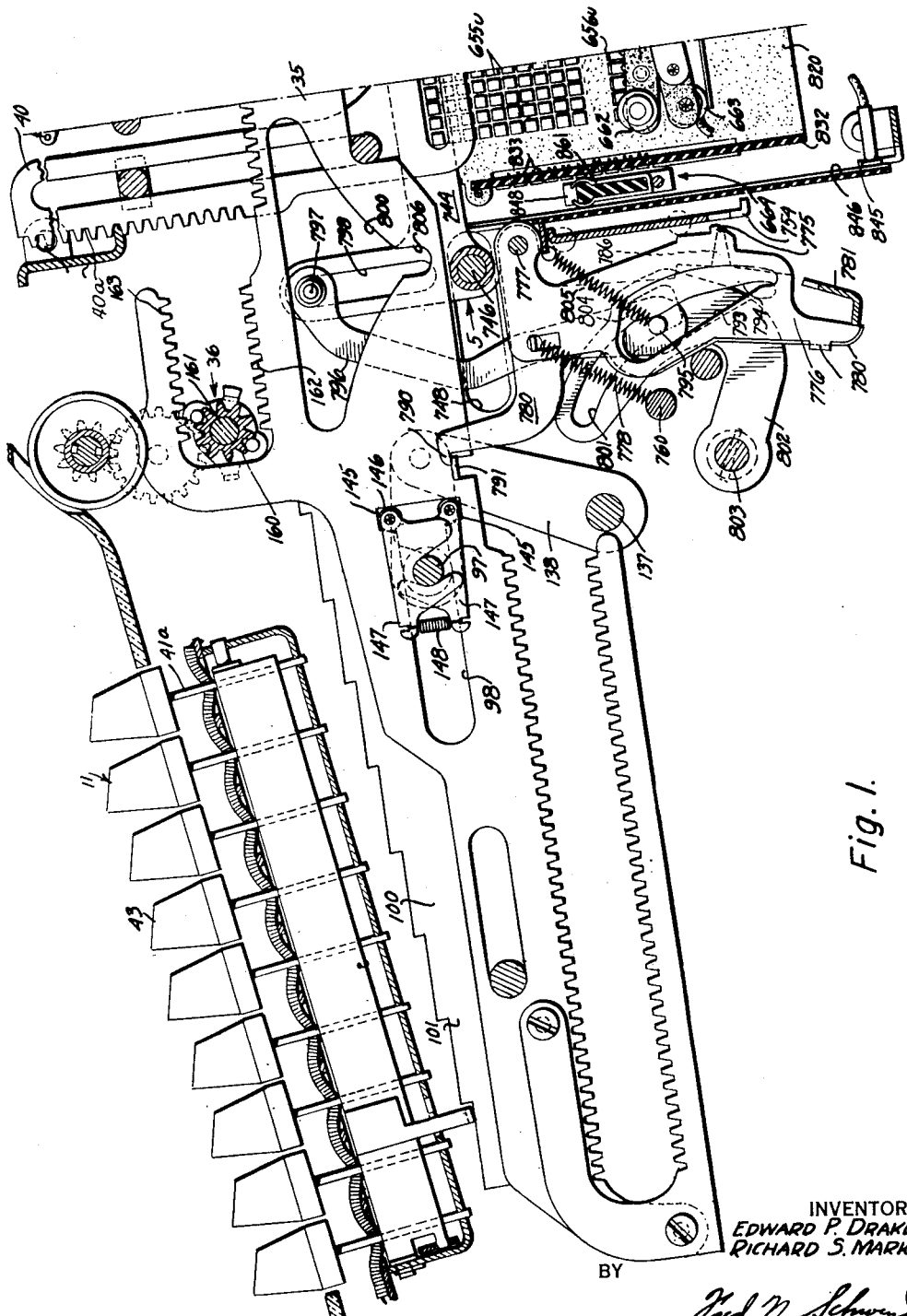

The mechanism of the present invention is intended to be embodied in the calculating machine disclosed and claimed in the aforesaid R. E. Boyden et al. patent. Accordingly, reference is hereby made to said patent for a complete disclosure of a calculating machine to which the present invention may be applied. Therefore, for the sake of brevity, only that mechanism which embodies the present invention and that which directly cooperates therewith will be described herein in detail. It should be understood, however, that the invention may be equally well embodied in other forms of machines and may be used in connection with other forms of calculating machine mechanisms such as division mechanisms, etc.

General description

The machine in which the present invention is embodied is of the reciprocating rack type utilizing differentially operable reciprocating racks 35 (Figs. 1 and 2) to transfer mechanical representations of values between different operating units of the machine such as the keyboard, generally indicated at 11, accumulators, i. e. 6 and and 36, multiplying mechanism, etc.

In performing multiplication, the multiplicand is first set up in the keyboard and suitable controls are effected to differentially advance the racks under control of the depressed keys. During return of the racks to their original home positions associated multiplicand racks 40 are operatively connected therewith through mechanism not shown and are thereby moved downwardly to positions mechanically representing the values of the multiplicand digits. The multiplicand racks thus form a multiplicand receiving and representing device and remain in their adjusted positions throughout the multiplication operation.

Thereafter, the multiplier is set up in the keyboard and a multiplication control bar 14 (Fig. 8) is depressed. The latter bar institutes operation of the multiplying mechanism and also causes the racks 35 to be differentially advanced forwardly amounts controlled by the depressed keys. The racks 35 are retained in their forwardly advanced positions throughout the multiplication operation, thus forming a multiplier value receiving device.

Although the racks, or rather those racks in orders wherein multiplier digits have been entered, are all simultaneously moved forward to mechanically represent the multiplier factor, only one of such racks controls the multiplication at any one time. For this purpose, multiplier denomination control means are provided to sequentially set a multiplier control carriage generally indicated at 5 (Fig. 1) to positions corresponding to the settings of the different racks, the carriage being first set to correspond to the setting of the lowermost order rack containing a significant multiplier digit. After multiplication by a multiplier digit represented by the positioning of the multiplier carriage, the latter is set to correspond to the setting of the next higher order rack containing a significant digit.

The conjoint positioning of the various multiplicand racks 40 and the multiplier carriage 5 condition certain of a plurality of ordinally arranged groups of circuits arranged in accordance with the partial products of the multiplication tables. The latter circuits control actuation of the partial product accumulator 6 (Fig. 2) by de-clutching the differential drive therefor when the latter registers the partial product resulting from the multiplication of the multiplicand by a selected digit of the multiplier.

A denomination distributing device in the form of a circuit shifting switch generally indicated at 664 (Figs. 1 and 13) is controlled by the aforementioned denomination controlled mechanism for determining the particular orders of the accumulator 6 into which separate partial products of the multiplication are to be entered.

Power drive

The machine is driven by two separate power units operable by a single motor 420 (Fig. 6), one power unit comprises a cyclically operable main clutch 7 which is operatively connected to a main drive shaft 8 for the purpose of operating the main units of the machine during the first and last phases of a multiplication operation. The second power unit comprises a cyclically operable multiplier clutch 9 which drives the multiplier drive shaft 10 to operate the multiplying portion of the machine and related mechanisms during the intermediate phases of a multiplication operation. Operation of the multiplier clutch is initiated by the main clutch and vice versa.

Actuator drive

The various actuator racks 35 (Figs. 1 and 2) are each supported for fore and aft movement at their rear by a cross shaft 95 embraced by open slots 96 formed in the racks. At its forward end, each rack is supported by a rack drive shaft 97 suitably guided for fore and aft movement in slots, one of which is shown at 142 (Fig. 3) formed in machine side frames 143. The shaft 97 extends through and is movable along slots 98 in the various racks.

For the purpose of differentially controlling the extent of travel of the racks 35, there is provided in operative relation to each rack a series of nine amount keys 43 ranging in value from "one" to "nine" forming part of the keyboard 11. Each key is depressible into a set position wherein a key stem 41a thereof is positioned to be engaged by a shoulder 101 of a rack stop bar 100 which for the purpose of the present disclosure may be considered as attached to its respective rack in the position illustrated.

The racks 35 are arranged to enter amounts into or total amounts out of accumulators, one of which is generally indicated at 36. This accumulator comprises a plurality of denominationally arranged accumulator gears 160 rotatably mounted on the shaft 161 which may be raised or lowered to selectively mesh the gears with upper gear sections 163 or lower gear sections 162 of the racks. The controls and construction of this and other accumulators are disclosed in the aforementioned Boyden et al. patent.

Figure 3:
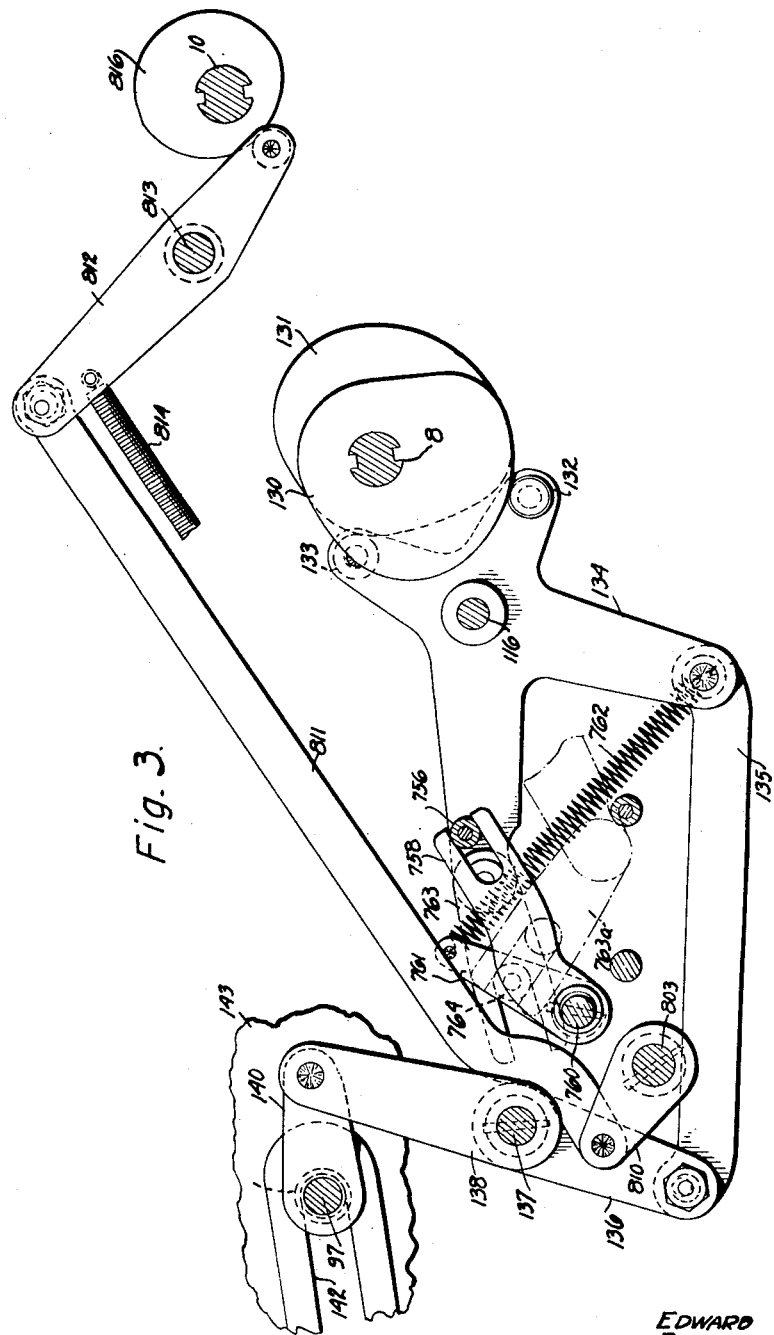
Fig. 3 is a side view showing the mechanism for driving the racks and for setting the multiplier digit selecting device in home position.

Means are provided for yieldably transmitting a drive from the main shaft 8, when the latter is operated by the main clutch 7, to the racks 35. Referring to Fig. 3, a pair of complementary rack drive cams 130 and 131 are keyed to the aforementioned shaft 8. These cams are engaged by rollers 132 and 133, respectively, carried by a cam follower 134. The latter is pivoted at 116 and is connected by a link 135 to an arm 136 on a rock shaft 137.

Also secured to the shaft 137 are spaced arms 138 connected by links 140 to the rack drive shaft 97 whereby to transmit fore and aft movement to the latter shaft.

The slot 98 (Fig. 1) in each of the racks terminates at its rear in laterally opposed notches 145. Each of these notches is normally engaged by a roller 146 carried on a carrier 147 pivoted on the shaft 97. The two carriers 147 associated with any one rack are spring urged in opposite directions by a spring 148 extending therebetween to yieldably maintain the rollers 146 in engagement with the notches 145 to thereby form a yieldable connection between the drive shaft and each of the racks.

*Addition controls*

In the operation of the machine to additively enter a factor into the accumulator 36, this factor is first set up in the keyboard and an add bar 15 (Fig. 8) is depressed causing operation of the machine and engagement of the main clutch 7 to operate through a complete cycle. Means (not shown) are provided under control of the add bar 15 to cause the accumulator 36 to mesh with the gear section 162 of the racks.

Figure 8:
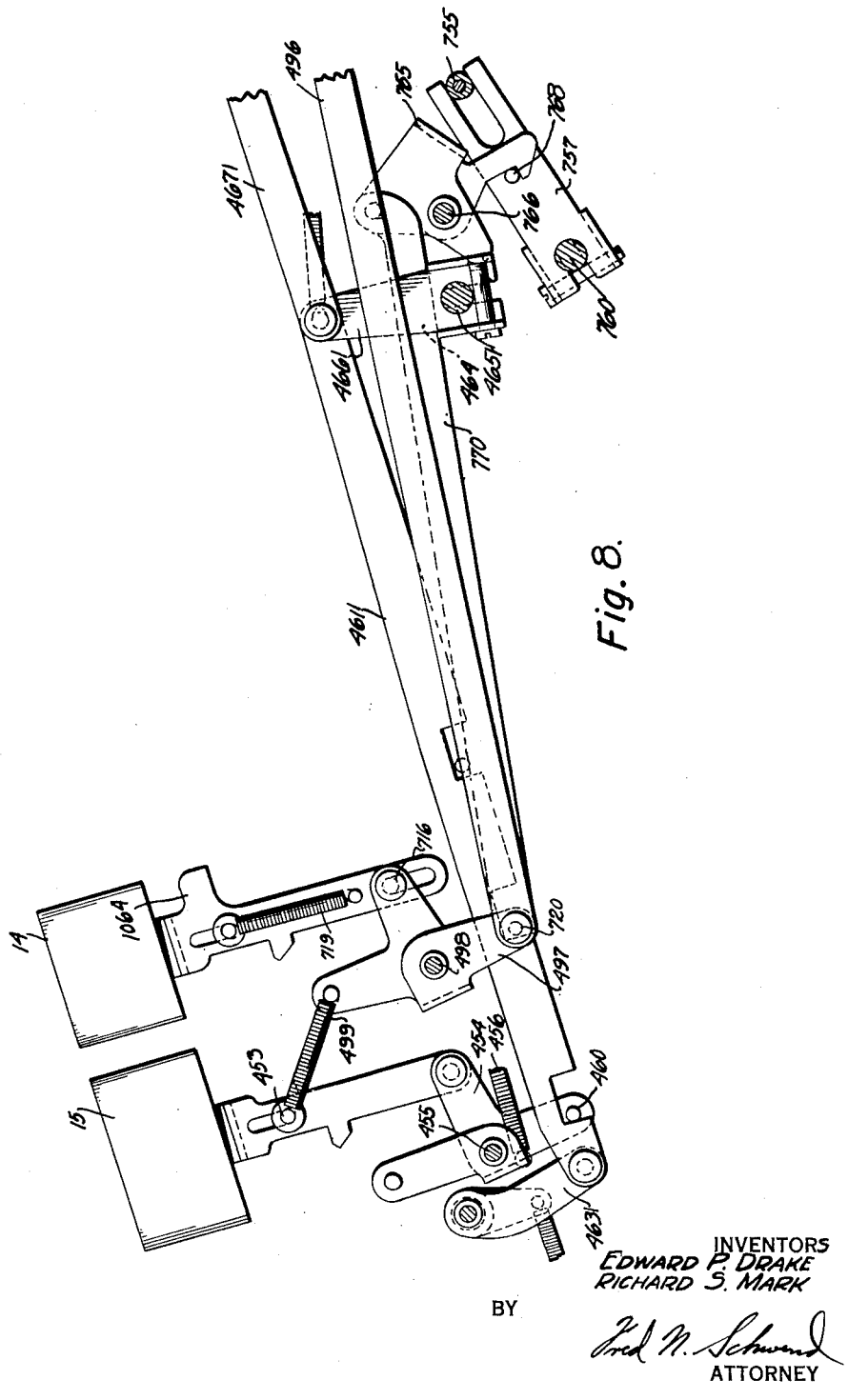
Fig. 8 is a side elevation illustrating part of the machine controls, including the add and second factor control bars.

Referring to Fig. 8, the stem of the add bar 15 is provided with a vertical slot guided over frame pin 453. The lower end of the stem is pivotally connected to a bell-crank 454 pivoted at 455 and urged counterclockwise by spring 456 to normally hold the add bar in its illustrated raised position. A pin 460 on the lower arm of the bell crank 454 extends within a notch of a clutch control bar 4611. The latter is supported for lengthwise movement by swinging arms 4631 and 464, the latter being fastened to a rockable shaft 4651 to which is also fastened a similar arm 4661 connected to the forward end of a second clutch control bar 4671.

Figure 6:
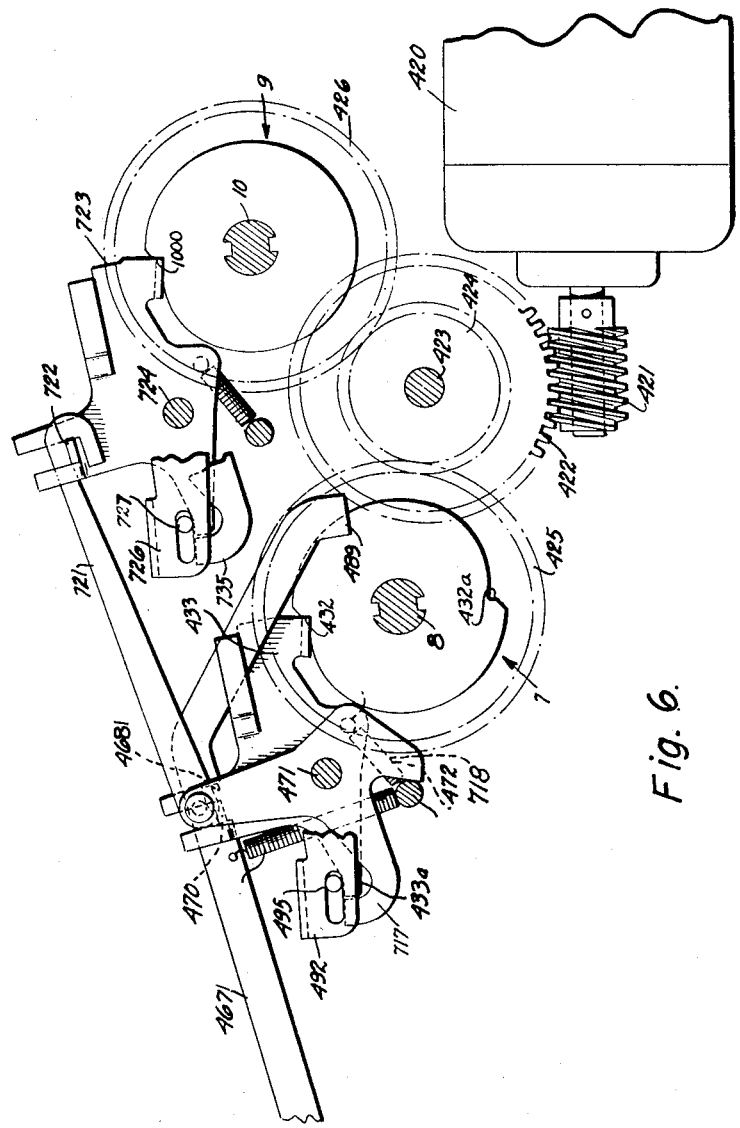
Fig. 6 is a side elevation illustrating part of the controls for the main and multiplier clutches, and the motor drive therefor.

Referring to Fig. 6, the clutch control bar 4671 is provided with a notch 4681 normally embracing an ear 470 on a main clutch control dog 433. The latter is pivoted at 471 and is urged clockwise into engagement with a full cycle shoulder 432 of the main clutch by a spring 472 to normally hold the clutch disengaged. However, upon depression of the add bar and consequent forward movement of the bars 4611 and 4671, the control lever 433 will be rocked counterclockwise out of engagement with the shoulder 432, causing engagement of the main clutch. At the same time a motor circuit is closed causing the motor 420 to drive a worm 421 on the armature shaft thereof. The latter meshes with and drives a worm gear 422 rotatably mounted at 423 and fastened to a spur gear 424 which meshes with gears 425 and 426 operatively connected to the clutches 7 and 9, respectively. Thus the gear 425 will become effective, through the engaged clutch 7, to drive the shaft 8.

Figure 7:
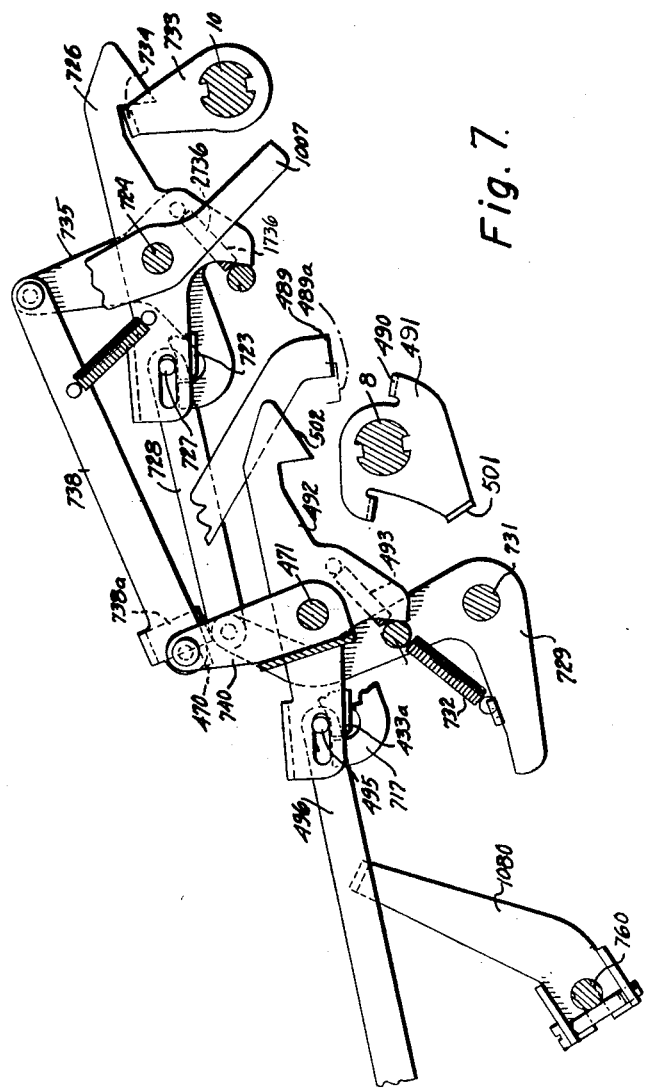
Fig. 7 is a side elevation illustrating further controls for the main and multiplier clutches.

Although the clutch control lever 433 is capable of arresting operation of the main clutch 7 at the end of the first phase or approximately 180° of rotation thereof during multiplication operations, as will appear later, by engaging a second shoulder 432a thereon, it is prevented from doing so during addition operations. For this purpose a camming lever 492 (Fig. 7) is also pivoted at 471 independently of the clutch dog 433 and is normally held in its illustrated position by spring 493. A slot is formed in the lever 492 to guide a pin 495 carried by the link 496 (see also Fig. 8) into either a forward position or a rearward position therealong. The latter is pivotally supported at its forward end by a bell crank 497 pivoted at 498 and normally held in a counterclockwise illustrated position by a spring 499 so as to normally maintain the pin 495 in its rearmost illustrated position. During addition, since the multiplication bar 14 is not depressed, the link 496 will be held in its rearward position, thereby maintaining the pin 495 over a tail 433a of the clutch dog 433.

During the first phase or 180° rotation of the main clutch an ear 490 on the camming member 491 (Fig. 7) will strike a surface 489 at the rear of the link 4671, rocking the latter upward out of engagement with the ear 470 on the clutch dog 433 so that the latter may be forced against the periphery of the main clutch. However, toward the mid-cycle or end of the first phase of a main clutch, the camming member 491 will carry an ear 501 thereon against a camming edge 502 on the lever 492, thereby rocking the latter counterclockwise to force the pin 495 against the tail 433a of the clutch dog to likewise rock the latter. Thus, the clutch dog will be rocked outward away from the clutch just as the shoulder 432a passes its mid-cycle position so that the clutch dog will be ineffective to arrest the clutch at this point.

Therefore, the clutch will continue on to the end of its cycle at which time the clutch control dog under the action of its spring 472 will engage the full cycle shoulder 432 to disengage the clutch.

*Multiplication controls*

Since the present invention is not concerned with the manner in which the multiplicand is entered into the multiplying mechanism pursuant to a multiplication operation, it will not be described herein, suffice it to say that the multiplicand racks are differentially advanced downwardly by amounts representing such multiplicand factor and are retained in set positions throughout the actual multiplication operation.

The multiplier factor in multiplication is entered into the machine subsequent to the entry of the multiplicand by setting the multiplier in the keyboard and depressing the multiplication bar 14 which initiates a multiplication operation.

The stem of the bar 14 is connected to the hereinbefore mentioned bell crank 497 through a pin and slot connection 716 and upon depression of the bar against the action of its spring 719 to its lowermost position, wherein it is held by a suitable latch mechanism (not shown), it will rock the bell crank 497 to draw the link 496 (see also Fig. 7) forward to position the pin 495 over the tail of a bell crank 717 (see also Fig. 6). The latter is pivoted at 471 independently of the clutch dog 433 and camming lever 492. The lever 717 is normally held in its clockwise illustrated position by a spring 718. Since the bar 14 is held in a depressed position throughout the multiplication operation, pin 495 will likewise be retained over the tail of bell crank 717 for the duration of this operation.

It will be noted on reference to Fig. 8 that the pivot pin 720 on the bell crank 497 extends within a second notch in the aforementioned clutch control bar 4611 so that when the multiplication bar 14 is depressed the pin will draw the clutch control bar forwardly to initiate operation of the main clutch in the same manner as described in connection with additive entry operations initiated by depression of bar 15.

Operation of the main clutch, through the rack drive mechanism heretofore described, will advance the various racks 35 differentially to positions controlled by depressed ones of the amount keys during the first phase or 180° of the clutch so as to set the racks to mechanically represent the values of the different digits of the multiplier factor set up in the keyboard. However, in this case, the main clutch will be arrested at the mid-point in its cycle as will be described presently, thereby maintaining the racks in their differentially advanced positions throughout the succeeding multiplication operation.

Toward the end of the first 180° of movement of the main clutch 7 during a multiplication operation, the ear 501 (Fig. 7) of the member 491 will cam the lever 492 counterclockwise, causing the pin 495 (now located over the tail of bell crank 717) to rock the latter which through a link 721 (Fig. 6) connected between the bell crank 717 and an ear 722 of a multiplier clutch control dog 723 (similar in construction and function to the main clutch control dog 433) will rock the dog 723 to cause engagement of the multiplier clutch.

A lever 726 (Fig. 7) similar to the lever 492, is pivoted at 724 independent of the clutch dog 723 and is urged clockwise by a spring 1736. This lever is provided with an elongated slot embracing a pin 727 on a link 728 which is pivotally connected to a bell crank 729. The latter is fulcrumed at 731 and is urged clockwise by a spring 732 to normally hold the pin 727 in its rearward illustrated position wherein it overlies the tail of the multiplier clutch dog 723.

Keyed on the multiplier shaft 10 is a member 733 having an ear 734 which will normally cam the lever 726 counterclockwise just prior to the end of a multiplier clutch cycle thereby causing the pin 727 to rock the clutch dog 723 away from the periphery of the multiplier clutch as the full cycle indentation 1000 on the clutch periphery moves past its full cycle position, thereby re-initiating a new clutch cycle.

The foregoing re-cycling of the multiplier clutch will continue until the multiplicand is multiplied by all significant digits of the multiplier, one cycle for each significant digit, at which time the bell crank 729 is rocked counterclockwise as will be described hereinafter to position the pin 727 in the forward end of the slot in lever 726 and in a position overlying the tail of a bell crank 735. The latter is normally held in its position shown by spring 2736. The bell crank 735 is connected by a link 738 to a lever 740 pivoted at 471.

As the multiplier clutch 9 approaches the end of its final cycle, in which case the pin 727 will have been positioned over the tail of bell crank 735, the member 733 on the shaft 10 will again rock the lever 726 but since the clutch lever 723 is not now held away from the periphery of the clutch at this time, the clutch will automatically become disengaged. On the other hand, the bell crank 735 will be actuated by pin 727 and will force the link 738 to the left as viewed in Fig. 7, causing a bent over portion 738a thereon to engage the ear 470 of the main clutch dog 433 to reengage the latter clutch so that it may continue on with its second 180° of operation. At the end of this time the main clutch will become automatically disengaged, thus completing the multiplication operation.

Contact carriage

The multiplying mechanism includes ordinally arranged partial product circuit selecting contact elements 654 (Figs. 2 and 13) which are coordinately adjustable in a vertical direction in accordance with the multiplicand values and in a horizontal direction in accordance with multiplier values. For this purpose, the contact elements are movable along horizontally extending slots 742 in the multiplicand racks 40 and along vertical slots 743 in ordinally arranged plates 744 juxtaposed associated racks 40 in the different orders of the machine.

The various plates 744 are fixed in spaced relation to each other on rods 745 (Fig. 2) and 746 (Fig. 1), the assembly thus formed constituting what will be termed a contact carriage generally indicated at 5. The rods 745 and 746 are guided fore and aft of the machine in elongated slots 747 and 748, respectively, provided in machine side frames 143 whereby the carriage may be guided horizontally to concomitantly carry the various contact elements 654 into alignment with different vertical rows of partial product circuit terminals, certain of which are indicated at 655U. Suitable means (not shown) are provided to electrically insulate the carriage from the frame of the machine.

Contact carriage setting means

As previously described, multiplication is performed by successively multiplying all digits of a multiplicand by the successive denominationally arranged digits of the multiplier factor, i. e. by one multiplier digit at a time. Consequently, denomination selecting means are provided for causing the racks 35 in successively higher orders of the machine to control fore and aft positioning of the contact carriage whereby to likewise successively adjust the contact elements 654 into registry with different vertical rows of the partial product circuit contacts. When a rack 35 is retained in a position representing a multiplier digit of zero, the denomination selecting control means will not shift the contact carriage in accordance with such zero digit but will transfer control to the rack in the next higher denominational order and no idle multiplier cycle will occur in accordance with said zero multiplier digit.

Figure 5:
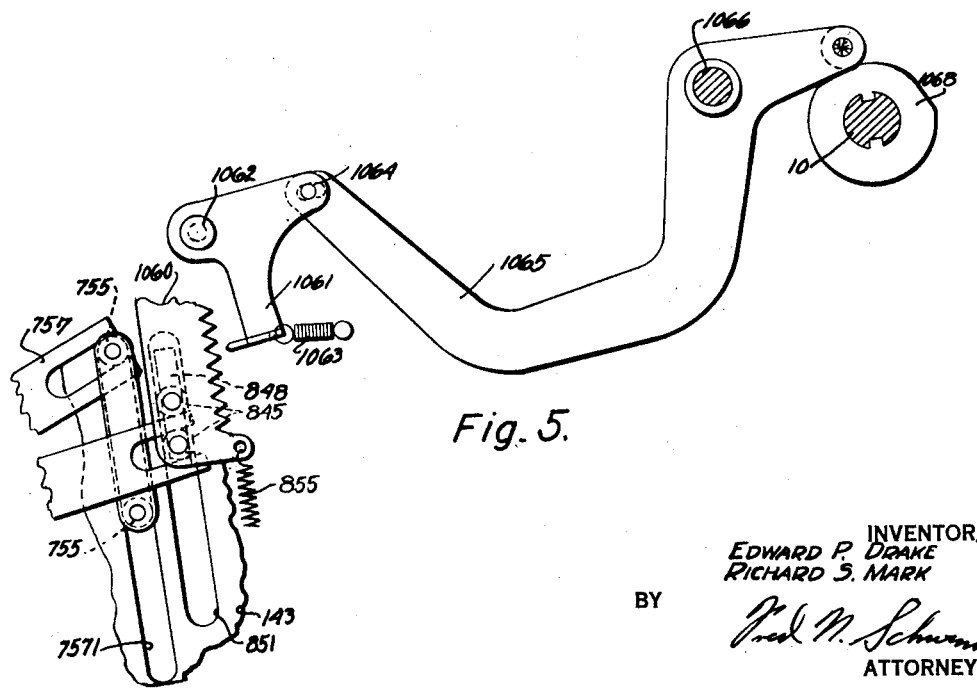
Fig. 5 is a side elevation of the mechanism for locking the denomination distributing device in any of its adjusted positions.

Referring to Figs. 1 and 10, the denomination selecting means comprises a vertically shiftable denomination controlled plate 754 which extends across the machine and is mounted on rollers 755 on one side and 756 on the other, the said rollers being guided within vertically extending slots 7571 (see also Fig. 5) formed in the machine side frames 143.

The plate 754 is guided vertically in parallel movement by yoked arms 757 and 758 (Figs. 8 and 3, respectively) on opposite sides of the machine embracing the upper ones of the rollers 755 and 756, respectively. The arms are both secured to rockable shaft 769 on which is also secured an arm 1030 (Fig. 7) and a second arm 761 (Fig. 3). The latter is urged clockwise by tension spring 762 whereby to urge the plate 754 downwardly. As shown in Fig. 3, a yoked arm 763 is pivoted to one arm of the cam follower 134 and is bifurcated to embrace a roller 764 on the arm 761. The arm 763 and cam follower 134 form a toggle which when the main clutch is in full cycle position, as illustrated, holds the yoked arm against the roller 164 to maintain the plate in its raised position. During a main clutch cycle, the cam follower 134 rocks counterclockwise moving the arm 763 to the position illustrated by the dot-and-dash line 763a. Now, during the cycling of the multiplier clutch as previously mentioned, the main shaft 8 will be held in its half cycle position, thus retaining the arm 763 in its lowermost position to allow the plate 754 to be moved downwardly by the joint influence of gravity and spring 762 if not otherwise restrained.

A second device is provided to prevent downward movement of the plate 754 except during multplication operations. As shown in Fig. 8, a latch 765 is fulcrumed at 766 and is connected to the multiplication key operated bell crank 497 by a link 770. The latch normally engages a pin 768 on the arm 757 to latch the latter in place. However, upon depression of the multiplication key 14, the latch is released, permitting the plate 754 to move downwardly when the main shaft is rotated.

Figure 4:
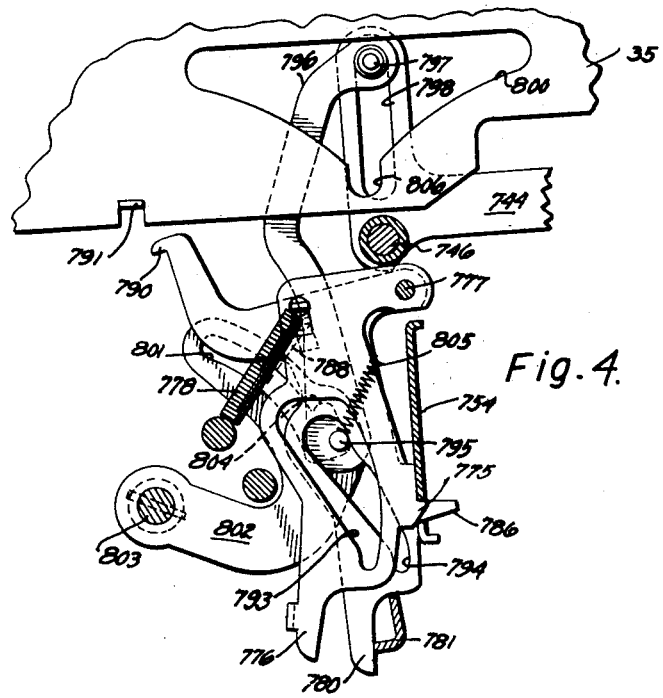
Fig. 4 is a detailed side elevation view illustrating the machine in a multiplying condition and with the multiplier digit selecting device in an operative position.

Referring to Fig. 10, it will be noted that the plate 754 is provided with a series of denominationally or ordinally arranged inverted L-shaped notches 774, the notches being arranged in echelon, progressing upwardly and to the left from the lowermost denominational order. The path of movement of the vertical leg of each notch is located in alignment with the nose 775 (see also Figs. 1 and 4) of an advance sensing lever 776 pivoted at 777 and urged counterclockwise by spring 778.

Levers 776, as well as juxtaposed selection control levers 780, also pivoted at 777 in each order, are urged counterclockwise by springs 778 and 788, respectively, but are normally held outward in positions illustrated in Fig. 1 by a bail 781.

Means (not shown) are provided during multiplication operations to cause the bail 781 to retract, enabling the various levers 776 and 780 in each order to be moved rearward by their respective springs and into contact with plate 754, unless otherwise prevented from doing so as will appear presently.

If all the sensing levers 776 are allowed to move rearward, the nose 775 of one only thereof will be able to locate within a notch 774 in the denomination selecting plate 754 while the remaining noses will merely move into engagement with the surface of the plate either above or below its associated notch, depending upon the position of the plate at that time. Each of the selecting levers 780 also has a nose 786 thereon adapted to move into the horizontally extending portion of the aligned notch 774 in the plate 754 after the advance sensing lever has moved inward to block the downward movement of the plate.

Means are provided for preventing a pair of control levers 776 and 780 from blocking downward movement of the plate 754 if the associated rack is in its zero or home position as would be the case if a zero is registered in the associated order of the multiplier factor. For this purpose, an ear 791 on each rack is adapted to underlie a nose 790 of an associated control lever 780 when the rack is in its zero position. When the selecting lever 780 is held outward against the action of its spring it, in turn, will hold its associated sensing lever 776 outward by virtue of an ear 792 on the latter overlying the lever 780. In this condition, the aligned notch 774 in the plate 754 will not be engaged and the plate will be permitted to move downward until another notch is engaged by a pair of levers 776 and 780 in a higher denominational order wherein a significant digit is registered. Thus, all racks 35 which are moved to positions representing the value of any significant digit (other than zero) will remove their ears 791 from under the noses of the associated selecting levers 780, permitting the same to be moved by their springs inwardly into actual blocking engagement with a notch 774 in the denomination selecting plate or against the side of the plate in readiness to engage its aligned notches 774 as the plate progresses downward through its travel.

The plate 754, in conjunction with the various ordinally arranged sets of control levers 776 and 780, form the means for sequentially causing the different racks 35, starting from lower denominational order to control multiplication operations. For this purpose each set of levers 776 and 780 are provided with pear-shaped slots 793 and 794, respectively (Fig. 4), through both of which extends a pin 795 carried on the lower end of cam link 796. The upper end of the link carries a pin 797 which is slidable along a vertical slot 798 in an associated plate 744 of the aforementioned contact carriage 5. The pin 797 also extends into a triangular camming aperture 800 in the associated rack 35.

The pin 795 in the lower end of each link 796 also extends through an arcuate slot 801 formed in a juxtaposed lever 802 which is secured to a rockable shaft 803, there being one such lever in each order of the machine. Slot 801 is provided with a shoulder 804 under which the pin 795 is urged by a spring 805 which also normally maintains the link 796 in its raised position illustrated in Fig. 1.

However, the slot 794 in the lever 780 normally prevents the pin 795 from moving into a position under the shoulder 804 unless the two levers 776 and 780 are allowed to rock into their blocking relationship with the plate 754.

The various arms 802 are rocked clockwise from and to the positions illustrated in Fig. 1 once during each multiplying cycle. Therefore, when any set of levers 776 and 780 have moved counterclockwise into actual blocking positions, the associated pin 795 will be set in position below the shoulder 804 of the associated lever 802. During the ensuing oscillation of the shaft 803, the shoulder of the associated lever will draw the link 796 downwardly causing its pin 797 to cam along one or the other of the inclined camming surfaces of aperture 800 until the slots 798 in the plate 744 of the contact carriage 5 become aligned with the notch 806 of this rack.

Thus, during each multiplying cycle the contact carriage will be moved from a previously set position thereof to a new position corresponding to the setting of the associated rack 35 in the newly selected order. However, if the contact carriage is already in a position numerically corresponding to the numerical position of the rack 35 which is in control, the slot 798 in the associated carriage plate 744 will be in alignment with the notch 806 and, consequently, the carriage will not be moved.

Toward the end of the downward stroke of the lever 802 which is driving its associated link 796, the pin 795 of the link will cam along the forward edges of, first, the slot 794 (see Fig. 4) and thereafter the slot 793 in the lever 776, drawing the levers out of their blocking positions relative to the plate 754 so that the latter will be free to move downward until blocked by the corresponding levers of the next higher denominational order which contains a significant multiplier digit.

Describing now the means for oscillating the shaft 803, an arm 810 (Fig. 3) is fastened to this shaft and is connected by a link 811 to a cam follower 812 fulcrumed at 813 and urged counterclockwise by a spring 814 into cooperative relation with a cam 816 keyed on the multiplier shaft 10.

*Multiplying circuit arrangement*

Figure 2:
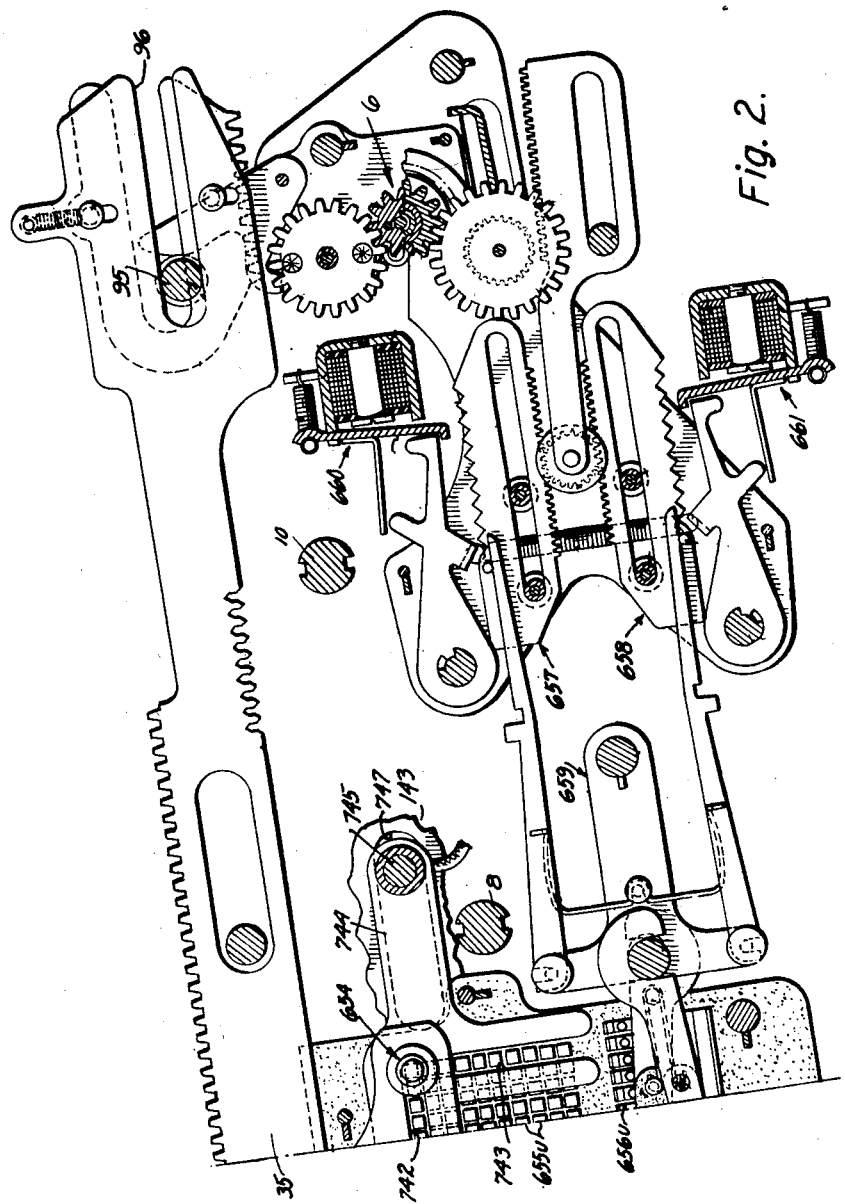

As mentioned hereinbefore, the machine comprises a multiplying mechanism of the partial product circuit type. This includes groups of partial product circuits in each order, one to control registration of the units component of a partial product and the other to control registration of the tens component of the same partial product. These two groups are mounted on separate plates located on opposite sides of the aforementioned contact element 655 in each order, one plate being illustrated at 820 (Figs. 1 and 2).

Each of the various circuits in any one group of partial product circuits includes one of a series of coordinately arranged terminals 655U (units component) and 655T (tens component) indicated diagrammatically in Fig. 13 which are connected to different terminal strips 656U and 656T, respectively. The particular circuit arrangements are not shown, suffice it to say that they are arranged in accordance with the respective units or tens components of the partial products tables. For example, the "zero" terminal strip 656U or 656T is located at the right in Fig. 13, the "one" terminal strip next, and so forth.

Considering the example of multiplying 4×3, the contact element 654 in the controlling denominational order would accordingly be set downward to a "three" multiplicand factor position and to the left (Fig. 13) to "four" multiplier factor position wherein a circuit would be completed to the "two" terminal strip 656U of the units component plate 820 and a second circuit could be completed to the "one" terminal strip 656T of the tens component plate 821 in that order.

The terminals 656U and 656T when energized, differentially control associated units and tens actuating devices generally indicated at 657 and 658, respectively, to differentially drive the accumulator 6 as will be seen presently.

The actuating devices 657 and 658 are so arranged relative to the partial product circuits that a tens component actuator 658 under control of the tens component partial product circuit in any one main rack order and the units component actuator 657 under control of the units component partial product circuits in the next higher main rack order jointly control a particular order of the partial product accumulator 6 so that the units and tens partial products of a multiplication may be simultaneously entered into the latter accumulator.

The actuators 657 and 658 in each accumulator order are differentially controlled by electromagnetic devices 660 and 661, respectively, which are selectively connected in circuit with the units and tens partial product circuits in different selected orders. The devices 660 and 661 are in circuit with contact rollers 662 and 663, respectively, movable along the terminal strips 656U and 656T for the units and tens partial product circuits, respectively, by constant excursion devices 659. For this purpose, the rollers 662 and 663 also are in continuous electrical contact with feeder bars 839 and 1839, respectively. Thus, when a roller 662 or 663 completes a conditioned partial product circuit, an electromagnetic device 660 or 661, respectively, connected in the circuit is energized to arrest the respective units or tens accumulator actuator 657 or 658.

A denomination distributing device generally indicated at 664 (Figs. 1 and 13) is provided to successively enter the various partial products of a multiplication into successively higher orders of the accumulator 6 as the multiplication progresses, in accordance with the well known laws of multiplication. This device is under control of the multiplier digit denomination selecting device 754 (Figs. 1 and 10) so that after the partial product representing the multiplication of all of the multiplicand digits by, for example, the lowest order digit of the multiplier, has been entered into the accumulator 6, the connections between the partial product circuits and the electromagnetic devices are shifted so that the next partial product representing the multiplication of all of the multiplicand digits by the next higher denomination or order digit of the multiplier will be entered into the next higher orders, in echelon, of the accumulator. If the next higher order digit in the multiplier factor should happen to be a zero, the selecting device 754 would, as mentioned hereinbefore, sense this condition and transfer control to the next higher order main rack and would at this time control the connections between the partial product circuits and the electromagnetic devices to be further shifted so that the next partial product will be entered into the second higher echelon of orders of the accumulator.

It should be noted at this point that the feeder strips 839 (Fig. 13) are connected in a manner to be described presently to certain of the electromagnetic control devices 660 while the feeder strips 1839 are similarly connected to certain electromagnetic control devices 661 to energize such devices when their associated orders of the partial product accumulator 6 have registered the proper partial product values, and it is these connections which must be shifted by the denomination selecting device 754 to accomplish the above result.

Referring to Figs. 1 and 11, there is attached across the forward edges of the partial product plate 820, etc., a plate 832 of insulating material to which are attached a series of diagonally extending conducting bars 833. These bars are located at the rear of the plate and have tabs 1834 extending therefrom through apertures in the plate. The tabs are bent over the forward face of the plate to form contact terminals. It will be noted by following any contact bar 833 that the tabs thereon are alternately bent in opposite directions. Also, it will be noted that the tabs on any one bar are ordinally spaced and the tabs of two adjacent conductor bars are located in side-by-side relation, thereby forming two groups of tabs in each denominational order.

The different conductor bars 833 are electrically connected to different ones of the feeder strips 839 and 1839 of the various partial product circuit assemblies as shown in Fig. 13, the different bars being alternately connected to the units and tens feeder strips 839 and 1839, respectively, of the different partial product assemblies from the lowermost or cents order. This arrangement is indicated in Fig. 13 wherein it will be understood that the lowermost diagonal bar 833 is permanently connected by a conductor 842 to the units feeder strips 839 of the lowermost "cents" order partial product circuit assembly which is not shown in Fig. 13. The next higher diagonal bar is connected by a conductor 842a to the tens feeder strip 839 of the lowermost "cents" partial product circuit assembly (also not shown). Likewise the next higher conductor bar 833 is connected by a conductor 843 to the feeder strip 839 for the units component partial product circuit assembly of the "dimes" order, the latter plate assembly being illustrated at the top of the partial product circuit assembly shown in Fig. 13. Also, the next higher conductor bar is connected by conductor 844 to the feeder strip 839 for the tens partial product circuit assembly of the "dimes" order. This arrangement or connection is similar for the sequentially higher conductor bars and higher orders of partial product circuit assemblies.

Parallel to the plate 832 (Fig. 1) is a second plate 845, also of insulating material stationarily mounted in the machine. Fixed to this plate are a plurality of vertically extending metallic conductor strips 846 (see also Fig. 13) which are aligned with different ones of the vertically extending groups of conductor tabs 1834 which are shown schematically as dots in this latter figure. One strip 846 in each order is connected by a conductor 847 to the terminal of a units component electromagnetic device 660 while the second strip in each order is connected by a conductor 847a to the terminal of a tens component electromagnetic device 661 in the corresponding order of the accumulator.

Intermediate the plates 832 and 846 is a denomination distributing or shift switch in the form of a bar 848. This bar is formed of insulating material and is guided in a vertical direction by rollers 845 (Fig. 5) suitably supported from opposite ends thereof and guided in vertical slots 851 formed in the machine side frame 143, the latter slots extending parallel to the aforementioned guide slots 7571 for the denomination selecting plate 754.

The switch bar 848 has a series of grooves 850 therein, two for each order, in which are fitted spring contact clips 861 which press outwardly so as to engage, on one side thereof aligned ones of the conductor tabs 1834 and on the other side thereof aligned ones of the vertical strips 846, thereby forming electrical connections between the strips and the different ones of the diagonal bars 833.

Means are provided for locking the switch bar 848 in any of its vertically adjusted positions throughout the major portion of each multiplier cycle even though the plate 754 is allowed to advance to its next lower position during such portion of the cycle so as to permit an overlap of the functioning of these two elements. For this purpose, a detent bar 1060 (Figs. 5 and 9) is secured to the bearing studs for the rollers 845 and has a plurality of detents therein, any of which is adapted to be engaged by a lock pawl 1061 fulcrumed at 1062 and urged out of engagement with the bar by a spring 1063. The pawl is coupled through a pin and slot connection 1064 to a cam follower 1065, pivoted at 1066, and held by the spring 1063 in operative relation with a cam 1068 keyed on the multiplier shaft 10.

As previously described, and in accordance with the present invention, means are provided for controlling alternate advancement of the denomination selecting plate 754 and the denomination distributing switch bar 848, and for controlling such advancement at a predetermined rate of speed regardless of the number of increments through which each element will advance in any one step due to the presence of zeros in the multiplier factor.

Figure 9:
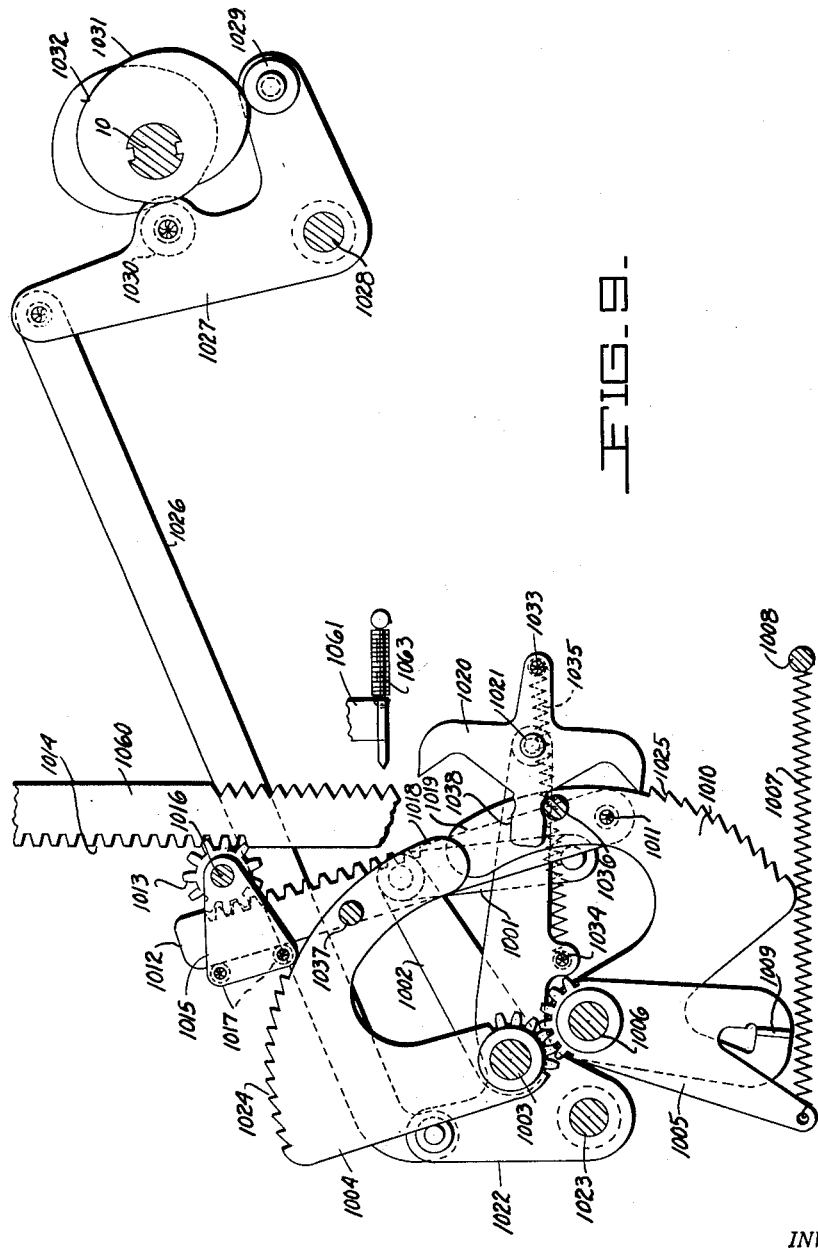
Fig. 9 is a side elevation illustrating the mechanism for controlling sequential and alternate advance of the denomination selecting and denomination distributing devices.

Referring to Fig. 9, the plate 754 is pivotally connected through a link 1001 to an arm 1002 fastened to a rockable shaft 1003 to which is also secured a combination rack and gear sector 1004. The gear teeth on element 1004 mesh with similar teeth on a second sector 1005 pivotally mounted on a shaft 1006 and urged counterclockwise by a spring 1007 tensioned between the sector and a frame stud 1008.

The sector 1005 is normally engaged by an ear 1009 formed on a ratchet 1010 also pivoted on the shaft 1006 independently of segment 1005. The ratchet 1010 is pivotally connected at 1011 to a rack 1012 meshing with a pinion 1013 which, in turn, meshes with a rack gear section 1014 on the upper end of the bar 1060.

The rack 1012 is maintained in constant mesh with pinion 1013 by a retainer 1015, pivotally mounted on a shaft 1016 which rotatably supports the pinion 1013, the retainer being provided with rollers 1017 rotatably engaging the forward edge of the rack 1012.

The ratchet teeth 1024 of sector 1004 and teeth 1025 of ratchet 1010 are arranged concentric about the respective shafts 1003 and 1006. Also, sector 1004 has an arcuate extension 1018 likewise concentric about the shaft 1003 while the ratchet 1010 has a similar arcuate extension 1019 concentric about shaft 1006.

Operatively associated with the ratchet teeth 1024 and 1025 is a double-ended pawl 1020 pivoted at 1021 on a bell crank 1022. The latter is pivoted at 1023 and is connected by a link 1026 to a cam follower 1027 fulcrumed at 1028 and having rollers 1029 and 1030 thereon engaging the peripheries of complementary cams 1031 and 1032, respectively, mounted on the multiplier shaft 10 and effective to oscillate pawl 1020 once during each multiplier cycle.

An over-center tension spring 1035 is extended between a pin 1033 on the pawl 1020 and a pin 1034 on the bell crank 1022. The spring 1035 is effective to hold the pawl in either its clockwise rocked position shown in Fig. 9 wherein its lower tooth is maintained in engagement with the periphery of arcuate extension 1019 or with one of the teeth 1025 of the ratchet 1010. Likewise, the spring is capable of maintaining the pawl in a counterclockwise position wherein its upper tooth is effective to engage either the arcuate extension 1018 or one of the ratchet teeth 1024 of the sector 1004.

The pawl 1020 has an extension 1038 thereon adapted, when the bell crank 1022 is rocked into an uppermost position by the cams 1031 and 1032, to engage a stationary frame pin 1037 (having no connection with sector 1004) and thereby rock the pawl 1020 counterclockwise into engagement with one of the ratchet teeth 1024.

With particular reference to Figs. 9 and 12, it will be recalled that the denomination selecting plate 754 will be allowed to move downward to its first multiplier digit selecting position during the first phase or 180° of the main clutch cycle preceding the multiplication operation so that the sectors 1004 and 1005 operatively connected therewith will also have been advanced like amounts. Likewise, since the pawl 1020 will be in the position shown in Fig. 9 at the start of a multiplication cycle, the ratchet 1010 will be held by the pawl 1020 in its position shown to hold the denomination distributing control bar 848 (Fig. 11) in its uppermost or initial switching position. However, during the first 77° rotation of the multiplying cycle, the cams 1031 and 1032 will become effective to advance the pawl 1020 upwardly, allowing the ratchet 1010 and consequently the bar 848 to follow under the urges of spring 1007 until the ear 1009 of the latter strikes the arrested sector 1005, at which time the switch bar 848 will be located in a position corresponding to the positioning of the denomination selecting plate 754 and, i. e., the selected denomination of the multiplier factor.

At approximately 130° the cams 1031 and 1032 will become effective to retract the bell crank 1022 and pawl 1020 toward its lowermost position as illustrated, permitting the sector 1004 to follow therealong at a rate of speed determined by cams 1031 and 1032 until the denomination control plate 754 is arrested in a position selecting the next higher order denomination digit. At the end of its downward stroke, the projection 1038 of pawl 1020 will strike frame pin 1036 and rock the pawl clockwise to a position re-engaging the ratchet 1010 thereafter coming to rest in its illustrated position. As the next multiplier cycle follows, the cams 1031 and 1032 will cause the pawl 1020 to continue its aforesaid excursion in which it will alternately pick up successive teeth 1024 and 1025 of the elements 1004 and 1010, respectively, until both the selection plate 754 and the bar 848 reach the bottoms of their travels incident to the completion of the multiplication operation.

During the second or final phase of the main clutch cycle initiated at the completion of the multiplying operation, the cams 130 and 131 (Fig. 3) will return the cam follower 134 to its illustrated position, causing yoked link 763 to raise arm 761 and thereby, through arms 757 (Fig. 8) and 758 (Fig. 3) likewise raise selection plate 754. This motion will rock elements 1004 and 1010 back to their positions illustrated in Fig. 9, during which time the teeth 1025 will merely rasp over the lower tooth of pawl 1020.

Having thus described the invention what we desire to secure by United States Letters Patent is:

1. In a calculating machine, a first device movable to any of a plurality of positions, a second device movable to any of a plurality of positions corresponding to any of said first mentioned positions, means controlled by said first device for arresting said second device in a position corresponding to a position occupied by said first device, means for moving said first device, means including a cam device for controlling the speed of movement of said first device, means for selectively arresting said first device in any of said positions, means for moving said second device, and means including said cam device for controlling the speed of movement of said second device.

2. In a calculating machine, a device movable from any of a plurality of positions to any other of said positions, spring means for moving said device, means for selectively arresting said device in any of said positions, an oscillating device movable through a predetermined stroke, means for causing said oscillating device to engage said first mentioned device at one end of the stroke thereof, and means for releasing said first mentioned device from said arresting means upon engagement of said first mentioned device by said oscillating device, said oscillating device being effective to retard movement of said first mentioned device during movement towards said arrested position thereof.

3. In a calculating machine, a first device movable to any of a plurality of positions, means for moving said device, a second device movable to any of a plurality of positions corresponding to said first mentioned positions, means for moving said second device, means including an oscillating element operable upon movement thereof in one direction to control said first mentioned moving means during movement of said first device to a selected one of said positions thereof, said element being operable upon movement thereof in the opposite direction to control said second mentioned moving means during movement of said second device, and means rendered effective by said first device for arresting said second device in a position corresponding to a position occupied by said first device.

4. In a calculating machine, a first device including a ratchet element movable to any of a plurality of positions, means for moving said device, a second device including a second ratchet element movable to any of a plurality of positions corresponding to said first mentioned positions, means for moving said second device, and means including an oscillating pawl engageable with said first mentioned ratchet element upon movement of said pawl in one direction to control said first mentioned moving means during movement of said first device to a selected one of said positions, said pawl being engageable with said second ratchet element upon movement of said pawl in the opposite direction to control said second mentioned moving means during movement of said second device, and means rendered effective by said first device for arresting said second device in a position corresponding to a position occupied by said first device.

5. In a calculating machine, a first device including a ratchet member movable to any of a plurality of positions, a second device including a second ratchet member movable to any of a plurality of positions corresponding to said first mentioned positions, means for moving said devices, an oscillating power device, a pawl carried by said device, said pawl being effective to engage and control said movement of either of said devices, means responsive to movement of said oscillating device in one direction for causing said pawl to engage said first mentioned ratchet element, means responsive to movement of said device in the opposite direction for causing said pawl to engage said second mentioned ratchet element, and means rendered effective by said first device for arresting said second device in a position corresponding to a position occupied by said first device.

6. In a calculating machine, calculation control mechanism including a factor selecting device movable to any of a plurality of positions to select any of a plurality of digits, respectively, and a denomination distributing device movable to different positions to distribute a digit in the result of a calculation in any of a plurality of denominational positions; means for moving said factor selecting device to a selected position, means for moving said denomination distributing device, means controlled by said factor selecting device for arresting said denomination distributing device in a position corresponding to a position occupied by said factor selecting device, a speed governing device, and means for causing said governing device to alternatively govern the rate of speed of said devices.

7. In a calculating machine, calculation control mechanism including a factor selecting device movable to any of a plurality of positions to select any of a plurality of digits, respectively, and a denomination distributing device movable to different positions to distribute a digit in the result of a calculation in any of a plurality of denominational positions; means for moving said devices, means for selectively arresting said factor selecting device in any of said positions thereof, a speed governor, means for causing said governor to alternately govern the rate of speed of said devices, and means for arresting said denomination distributing device in a position corresponding to a position occupied by said factor selecting device.

8. In a calculating machine, calculation control mechanism including a factor selecting device movable to any of a plurality of positions to select any of a plurality of digits, respectively, and a denomination distributing device movable to different positions to distribute a digit in the result of a calculation in any of a plurality of denominational positions; a first ratchet element operatively connected to said factor selecting device, a second ratchet element operatively connected to said denomination distributing device, means including an oscillating pawl engageable with said first ratchet element upon movement of said pawl in one direction to effect movement of said factor selecting device, means for selectively arresting said factor selecting device in any of said positions thereof, said pawl being engageable with said second ratchet element upon movement of said pawl in the opposite direction to effect movement of said denomination distributing device, and means for arresting said denomination distributing device in a position corresponding to the position occupied by said factor selecting device.

9. In a calculating machine, calculation control mechanism including a factor selecting device movable through a predetermined path to any of a plurality of positions to select any of a plurality of digits, respectively, and a denomination distributing device movable through a second predetermined path to different positions to distribute a digit in the result of a calculation in any of a plurality of denominational positions; spring means for moving said factor selecting device through said path thereof, means for selectively arresting said factor selecting device in any of said positions, spring means for moving said denomination distributing device through said path thereof, an oscillating control device, means for oscillating said control device at a predetermined rate of speed, said control device being effective upon movement thereof in one direction to engage and control movement of said factor selecting device to a selected one of said positions thereof, said control device being effective upon movement thereof in the opposite direction to engage and control movement of said denomination distributing device, and means for arresting said denomination distributing device in a position corresponding to a position occupied by said factor selecting device.

10. In a calculating machine, a first device movable to any of a plurality of positions, a second device movable to any of a plurality of positions corresponding to said first mentioned positions, independently operable means for moving said devices, means for controlling said first device to move at a predetermined rate of speed, means for selectively arresting said first mentioned device in any of said positions thereof, said first device being capable of effecting arrest of said second device in a position corresponding to an arrested position of said first device, and means for rendering said speed controlling means effective to cause said second device to move at a predetermined rate of speed.

11. In a calculating machine, a first device movable to any of a plurality of positions, a second device movable to any of a plurality of positions corresponding to any of said first-mentioned positions, means for moving said first device, means including a cam device for controlling the speed of movement of said first device, means for selectively arresting said first device in any of said first positions, means independent of said first-mentioned moving means for moving said second device, said first device being capable of arresting said second device in a position corresponding to a position occupied by said first device, and means including said cam device for controlling the speed of movement of said second device.

EDWARD P. DRAKE.
RICHARD S. MARK.

REFERENCES CITED

The following references are of record in the file of this patent:

UNITED STATES PATENTS

| Number | Name | Date |
|---|---|---|
| 2,515,692 | Boyden et al. | July 18, 1950 |